United States Patent
Jibbe et al.

(10) Patent No.: US 7,308,397 B2
(45) Date of Patent: Dec. 11, 2007

(54) METHOD FOR CONTROLLING AND EMULATING FUNCTIONAL AND LOGICAL BEHAVIORS OF AN ARRAY OF STORAGE DEVICES FOR DIFFERENT PROTOCOLS

(75) Inventors: Mahmoud K. Jibbe, Wichita, KS (US); Chin Khor, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 710 days.

(21) Appl. No.: 10/610,154

(22) Filed: Jun. 30, 2003

(65) Prior Publication Data
US 2004/0267516 A1    Dec. 30, 2004

(51) Int. Cl.
G06F 9/455    (2006.01)
G06F 3/00    (2006.01)
G06F 19/00    (2006.01)

(52) U.S. Cl. ............................ 703/24; 703/25; 710/15; 702/115; 702/119

(58) Field of Classification Search ................. 710/15; 703/24, 25; 702/115, 119
See application file for complete search history.

(56) References Cited

U.S. PATENT DOCUMENTS 5,533,190 A * 7/1996 Binford et al. ............... 714/6
5,548,783 A * 8/1996 Jones et al. .................... 710/16
6,188,973 B1 * 2/2001 Martinez et al. ............ 702/188
6,539,503 B1 * 3/2003 Walker ....................... 714/703
6,957,291 B2 * 10/2005 Moon et al. ................. 710/302

* cited by examiner

Primary Examiner—Paul Rodriguez
Assistant Examiner—Dwin McTaggart Craig
(74) Attorney, Agent, or Firm—Suiter Swantz PC LLO (57) ABSTRACT

A method for controlling and emulating the functional and logical behaviors of an array of storage devices is established by loading a software module to an array controller board. The software module is integrated into the array controller subsystem manager by providing the necessary parameters required to insert the device and can control the inbound and outbound activities (commands, data, and status packages) regardless of the type, interface, and protocol of the disk/tape device. This aspect of the method allows the user to control the drive state transition and inject errors on the inbound and outbound drive traffics. Also, the method of this invention allows the drive module to recover in case of an array controller failure and to be removed from a list of devices like a regular drive.

31 Claims, 9 Drawing Sheets

METHOD FOR CONTROLLING AND EMULATING FUNCTIONAL AND LOGICAL BEHAVIORS OF AN ARRAY OF STORAGE DEVICES FOR DIFFERENT PROTOCOLS

FIELD OF THE INVENTION

The present invention generally relates to the field of the testing of multiple storage devices, and particularly to a method and system for controlling and emulating behaviors in an array of storage devices.

BACKGROUND OF THE INVENTION

In a Storage Array Network (SAN), a customer will typically have multiple disk devices to achieve a storage area in the terabyte range. The disk devices may be of different types. The large number of disk drives and types of drives raises the probability of a system failure and increases the number of failure scenarios due to a given disk drive. There is currently a need to adequately test arrays of storage devices.

Therefore, it would be desirable to provide a method and system for controlling and emulating the functional and logical behaviors of an array of storage devices for different protocols.

SUMMARY OF THE INVENTION

Accordingly, the present invention is directed to a method and system for emulating storage device behavior in an array of storage devices.

In a first aspect of the present invention, a method and a computer readable medium containing program instructions are disclosed that perform certain method steps. These method steps include loading a controller and emulator module (CEM). The CEM controls an interface between a low level driver and a storage device interface circuit. The storage device interface circuit directly interfaces an array of storage devices. The command path is fed to the CEM to interpret command strings. The data path is fed to the CEM to manage data of a data bus. At least part of a status path is emulated by the CEM.

In a second aspect of the present invention, a system for controlling and emulating functional and logical behaviors of an array of storage devices has different protocols. The system includes an array controller and an array of storage devices communicatively coupled to the array controller. The array controller has a controller and emulator module (CEM) that is capable of emulating one or more storage devices of the array of storage devices.

The method of the present invention provides advantages without the need of additional hardware, such as emulating drives and traffic monitoring circuits. The present invention does not impact the performance of the system, but controls the state transition of protocol under test by error injection and drive emulation. Error injection is provided for inbound and outbound traffic of one or more drives. Emulation of one or more drives of a Storage Area Network tests the array system response to different types of drives without actually having the drive types in the system setup and isolates failures detected in labs and/or at customer sites. Different types of delays in handling transactions between the controller and drive trays are emulated. Drive migration may be emulated from one tray to another without performing the drive migration in an automatic fashion. Drive migration from one system to another may be accomplished without performing the drive migration in an automatic fashion. The traffic between an array controller module and multiple drives may be monitored with different filtering of different types of control or data information without the need of a protocol analyzer. The performance of an array controller on the drive side may be measured by collecting statistics. The impact of the drive response to the performance of the array controller may be measured for an ideal drive or the slowest drive.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The present invention relates to a system and method for controlling and emulating the functional and logical behaviors of an array of storage devices for different protocols. The system and method do not require additional hardware for implementation, are not limited to a topology or interface, and do not require a recompile of the controller firmware to use the drive module. The system and method may be used at a customer site for duplicating problems in a real application and/or may be used to record the activities/traffic to one or more drive trays. (The raw traffic is limited by the size of the allocated memory.) The present invention is useful for validating and debugging storage array systems that include disk drives and/or tape drives.

The present invention is characterized by an emulation mode and error injection. Emulation mode encompasses, but is not limited to, the following features: one drive, multiple drives in one or more drive trays, drive migration from system to system, drive migration from one drive tray to another, and drives of varying types. The drives may be of various types such as SCSI, Fibre, SAS, SCSI, SATA, etc. The drives may have different capacities and different rotational speeds (RPM). The drives may be single port or dual port. Error injection encompasses, but is not limited to, the following errors: reset, parity, data underrun, data overrun, out of order frames, cyclic redundancy check (CRC), etc. Different protocol violation errors may be injected in supported and unsupported options.

Figure 1:
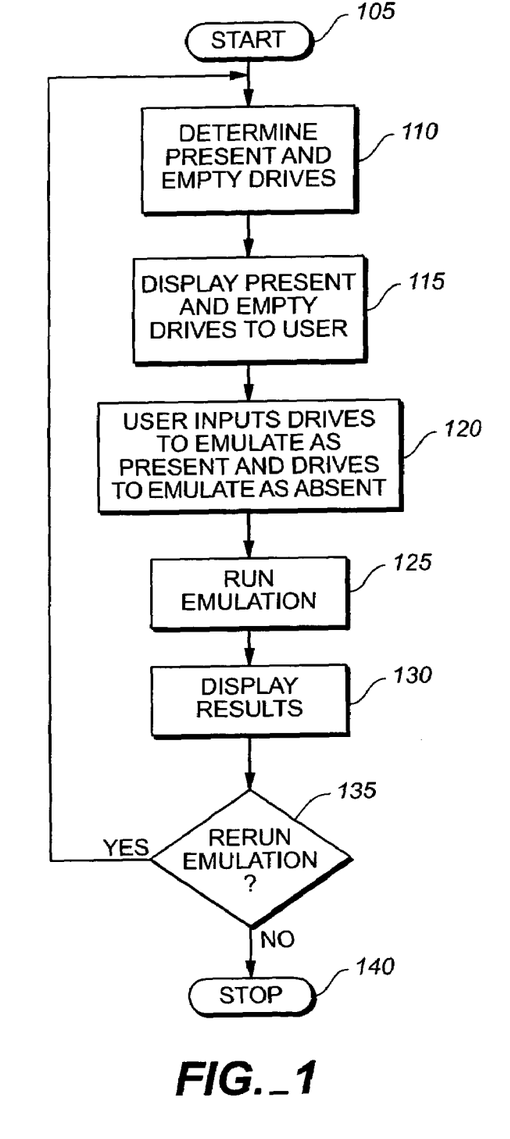
FIG. 1 illustrates an embodiment of a general method of the present invention.

FIG. 1 illustrates an embodiment of the method of the present invention. The controller and emulator module (CEM) preferably includes the following three functions: insertion function, removal function, and recovery function. The CEM is a software module loaded onto an array controller board. The software module is integrated into the array controller subsystem manager by providing the necessary parameters required to insert the device and can control the inbound and outbound activities (commands, data, and status packages) regardless of the type, interface, and protocol of the disk/tape device. The controlling and emulating module determines the drives that are present and absent (110). Alternatively, a user may input the present and absent drives. The present and absent drives may be displayed to the user on a graphical user interface (115). In this case, the user may input drives to emulate as present and/or input drives to emulate as absent (120). Alternatively, a software module may be activated, either automatically or through user input, to designate the drives to be emulated. The emulation is then run (125) and the results displayed (130). The results may displayed as a real time graph, in a tabular form, or in a similar manner. If the user chooses to rerun the emulation (135), processing proceeds to step 110; otherwise, processing stops 140. Although drives have been discussed, other types of storage devices may be used alternatively or additionally.

Figure 2:
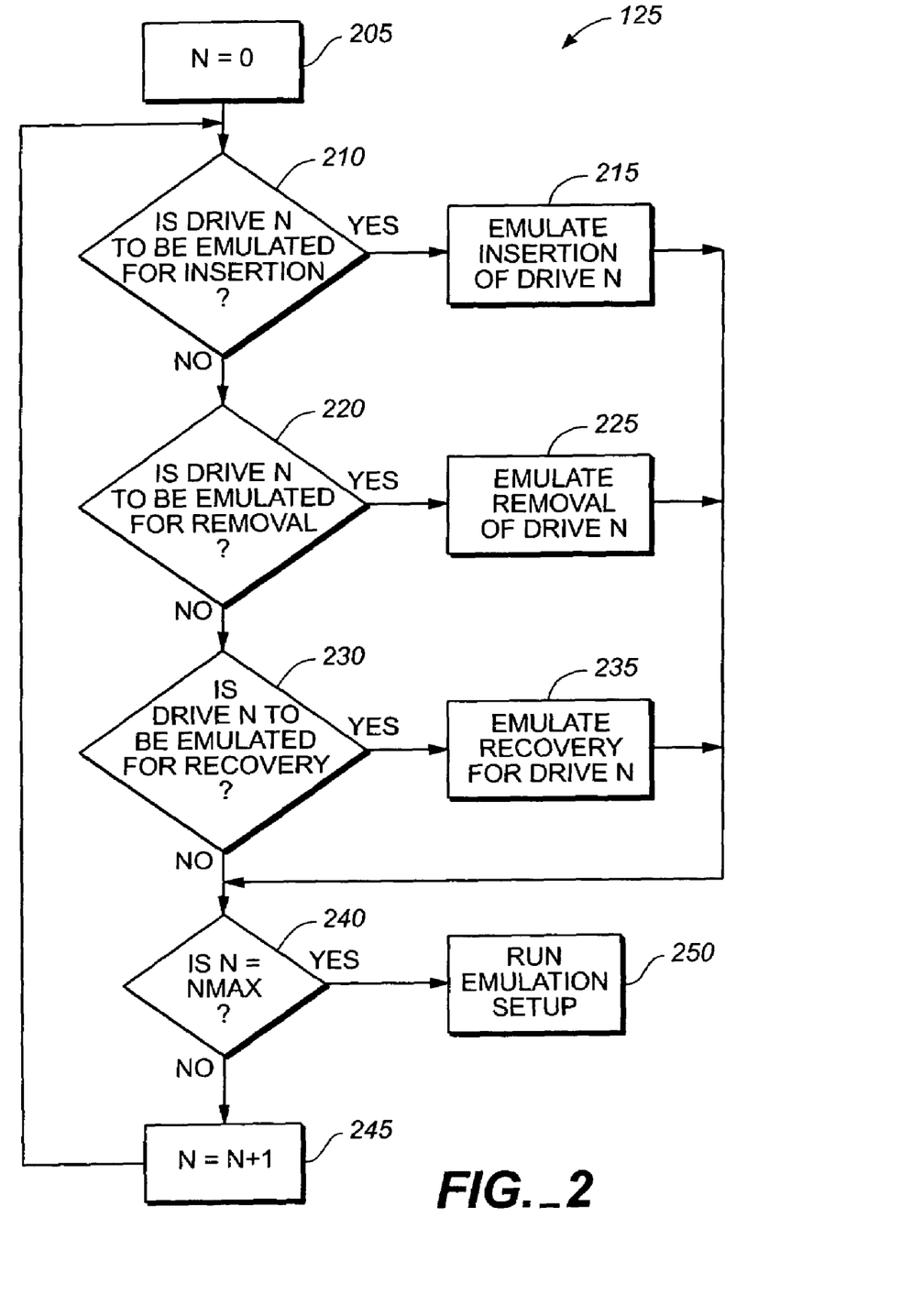
FIG. 2 illustrates an embodiment of an emulation process in the method of FIG. 1.

FIG. 2 illustrates an exemplary embodiment further describing step 125 of FIG. 1. In this embodiment, settings about each drive are successively accessed from the lowest numbered drive to the highest. The first drive number is set (205). If it is determined that the drive is to be emulated for insertion (210), settings for emulated insertion are set up (215). The settings may be stored in a look up table, may be entered into registers, may be stored in designated memory locations, or the like. Similarly, determinations are made as to whether the drive is to be emulated for removal (220, 225) or recovery (230, 235). The method may be implemented so that two or more operations may be emulated in a timed sequence for a given drive during one testing or debugging session. The drives are successively accessed (245). After the last drive has been accessed (240), the setup is run (250).

The insertion function is responsible for activating the CEM function similar to generate the stimuli observed when a physical drive is inserted into a drive tray. The stimuli generated by the CEM are described in the insertion logic flow chart of FIG. 3. The basic steps of insertion logic include allocating RS/6000 Platform Architecture (RPA) memory, initializing the loop, emulating LOGIN to the drive emulator, saving CEM information and notifying the HLD of a new device.

Figure 3:
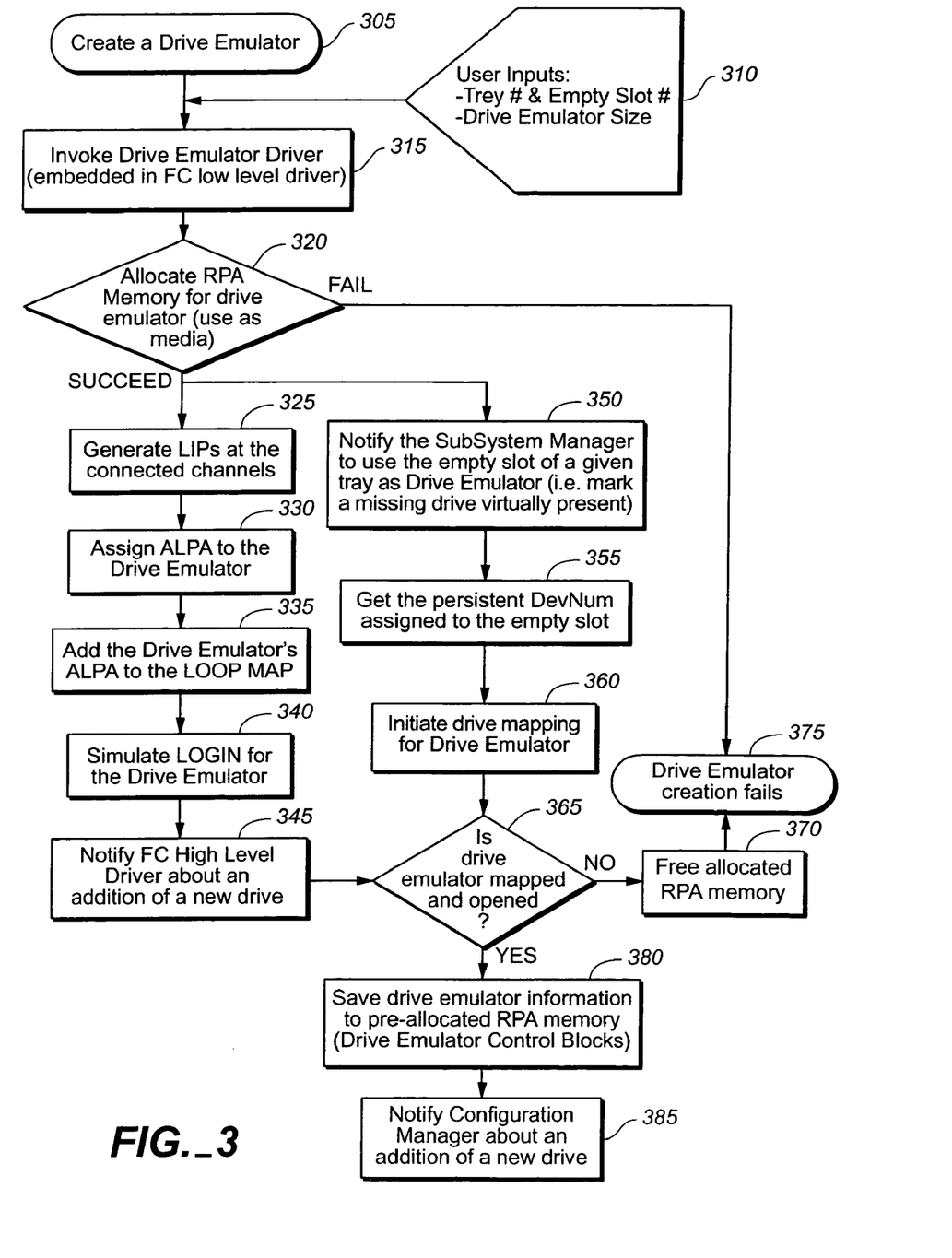
FIG. 3 illustrates an embodiment of an emulated insertion logic flow in the present invention.

FIG. 3 illustrates an exemplary embodiment of insertion logic flow in the present invention. A drive emulator is created (305). The user may input various emulation information, such as tray number, empty slot number, and drive emulator size (310). The drive emulator driver is invoked (315). The drive emulator driver may be embedded in a Fibre Channel low level driver. A determination is made as to whether RS/6000 Platform architecture or other memory has been allocated for use as media (320). If it has not, drive emulator creation is considered failed (375). Otherwise, two processing streams are inaugurated in parallel. In one processing stream, loop initialization procedures (LIPs) are generated at the connected channels (325), an arbitrated loop physical address (ALPA) is assigned to the drive emulator (330), the drive emulator's ALPA is added to the LOOP MAP (335), LOGIN is simulated for the drive emulator (340), and the Fibre Channel high level driver is notified as to the addition of a new drive (345). In the other processing stream, the subsystem manager is notified to use the empty slot of a given tray as a drive emulator (e.g., making a missing drive as virtually present) (350), the persistent device number (DevNum) assigned to the empty slot is obtained (355), and drive mapping for the drive emulator is initiated (360). After the two processing streams finish, a determination is made as to whether the drive emulator is mapped and opened (365). If not, the allocated RPA memory is freed (370) and the drive emulator creation is considered failed (375). Otherwise, the drive emulator information is saved to pre-allocated RPA memory (drive emulator control blocks) (380) and the configuration manager is notified about the addition of a new drive (385).

The removal function is responsible for activating the CEM function similar to generate the stimuli that are observed when a physical drive is removed from the drive tray. The stimuli generated by the CEM are described in the removal logic flow chart of FIG. 4. The basic steps for the removal logic include neglecting the CEM driver, notifying the subsystem manager to remove the CEM driver, freeing allocated memory, clearing CEM control blocks, and notifying the configuration manager to remove the CEM driver.

Figure 4:
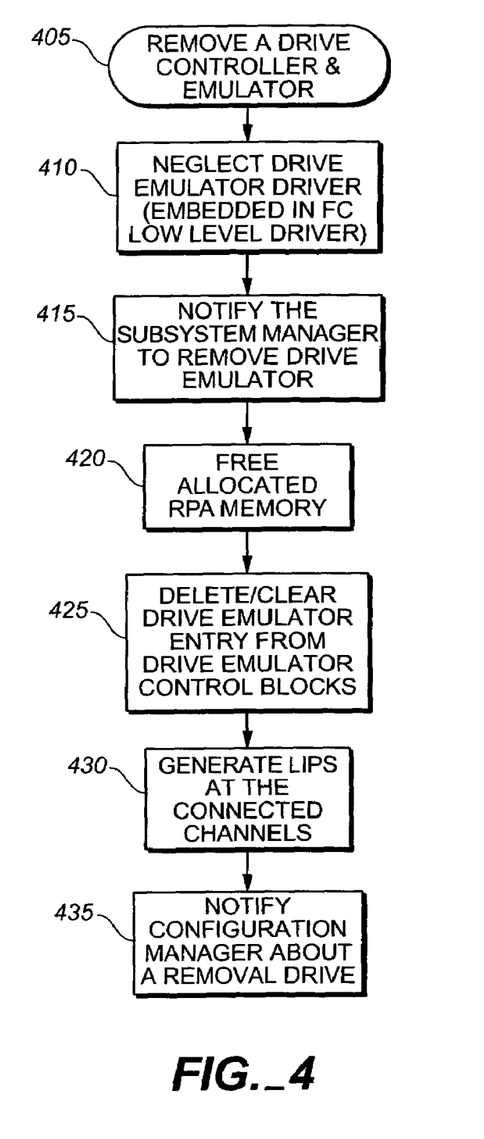
FIG. 4 illustrates an embodiment of an emulated removal logic flow in the present invention.

FIG. 4 illustrates an exemplary embodiment of the removal function process. A drive controller and an emulator are removed (405). The drive emulator driver embedded in a Fibre Channel low level driver is neglected (410). The subsystem manager is notified to remove the drive emulator (415). Allocated RPA memory is freed (420). The drive emulator entry is deleted or cleared from the drive emulator control blocks (425). LIPs are generated at the connected channels (430). The configuration manager is notified about the removal drive (435).

Figure 5:
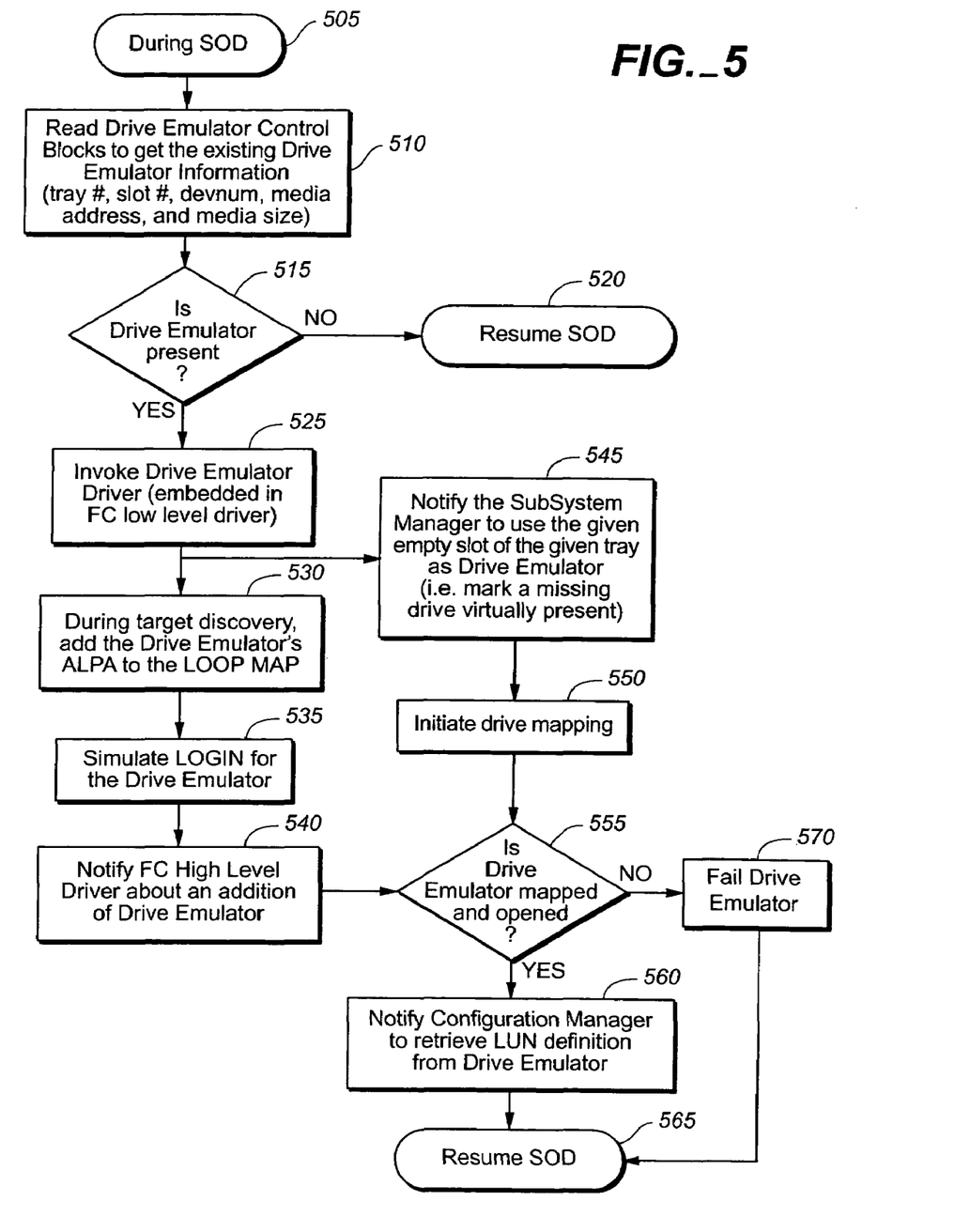
FIG. 5 illustrates an embodiment of an emulated recovery logic flow in the present invention.
Figure 6:
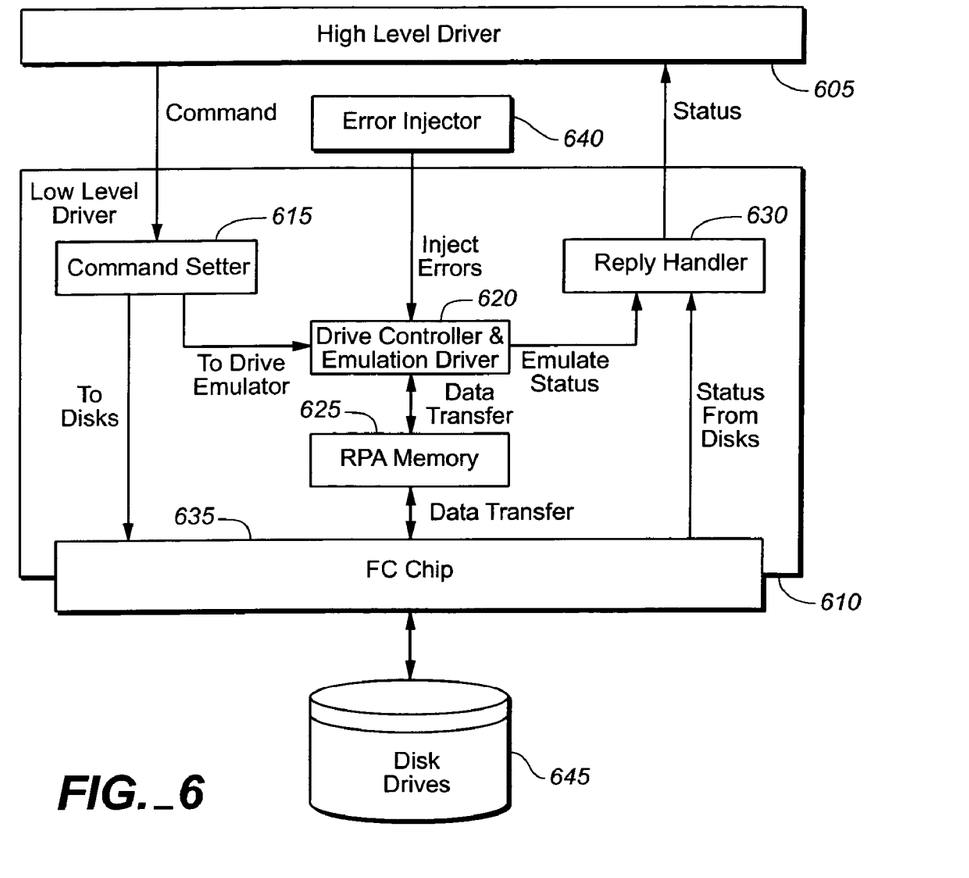
FIG. 6 illustrates an embodiment of a block diagram of the I/O path of the method of the present invention.

The recovery function is responsible for activating the CEM function to recover from a controller going through a Start of Day (SOD) stimuli observed when the array controller is reset. FIG. 5 illustrates an exemplary embodiment of the recovery logic process. During Start of Day stimuli (505), the drive emulator control blocks are read to obtain existing driver emulator information (510). This information may include tray number, slot number, device number, media address, media size, and the like. If it is determined the drive emulator is present (515), Start of Day processing continues 520. Otherwise, the drive emulator driver embedded in the Fibre Channel low level driver is invoked (525). Two processing streams are initiated in parallel. In the first processing stream, during target discovery, the drive emulator's ALPA is added to the LOOP MAP (530), LOGIN is simulated for the drive emulator (535), and the Fibre Channel high level driver is notified about an addition of a drive emulator (540). In the second processing stream, the subsystem manager is notified to use the given empty slot of the given tray as a drive emulator (i.e., a missing drive is marked as virtually present) (545) and drive mapping is initiated (550). When both processing streams are completed, a determination is made as to whether the drive emulator is mapped and opened (555). If not, the drive emulator fails (570) and Start of Day processing is resumed (565). Otherwise, the configuration manager is notified to retrieve the logical unit number (LUN) definition from the drive emulator (560) and Start of Day processing resumes (565).

The command, data, and status path give the CEM full control in terms of error injection in both the inbound and outbound paths. The flow chart of the I/O path of the CEM is shown in FIG. 2. The high level driver 605 issues a command to the low level driver 610. A command setter 615 interprets the command and issues to internal commands in response. One command is issued to the Fibre Channel chip 635 to perform an operation with the disk drives 645. Another command is sent to the drive controller and emulator driver 620. The drive controller and emulator driver transfers data to and from RPA memory 625 and receives as input errors injected by the error injector 640. The emulated status from the drive controller and emulator driver 620 is sent to the reply handler 630. Data is transferred to and from RPA memory 625 and the disk drives 645 via Fibre Channel chip 635. The Fibre Channel chip 635 sends status information from the disks to the reply handler 630 of the low level driver. The status information is transmitted by the reply handler 630 to the high level driver 605.

Figure 7:
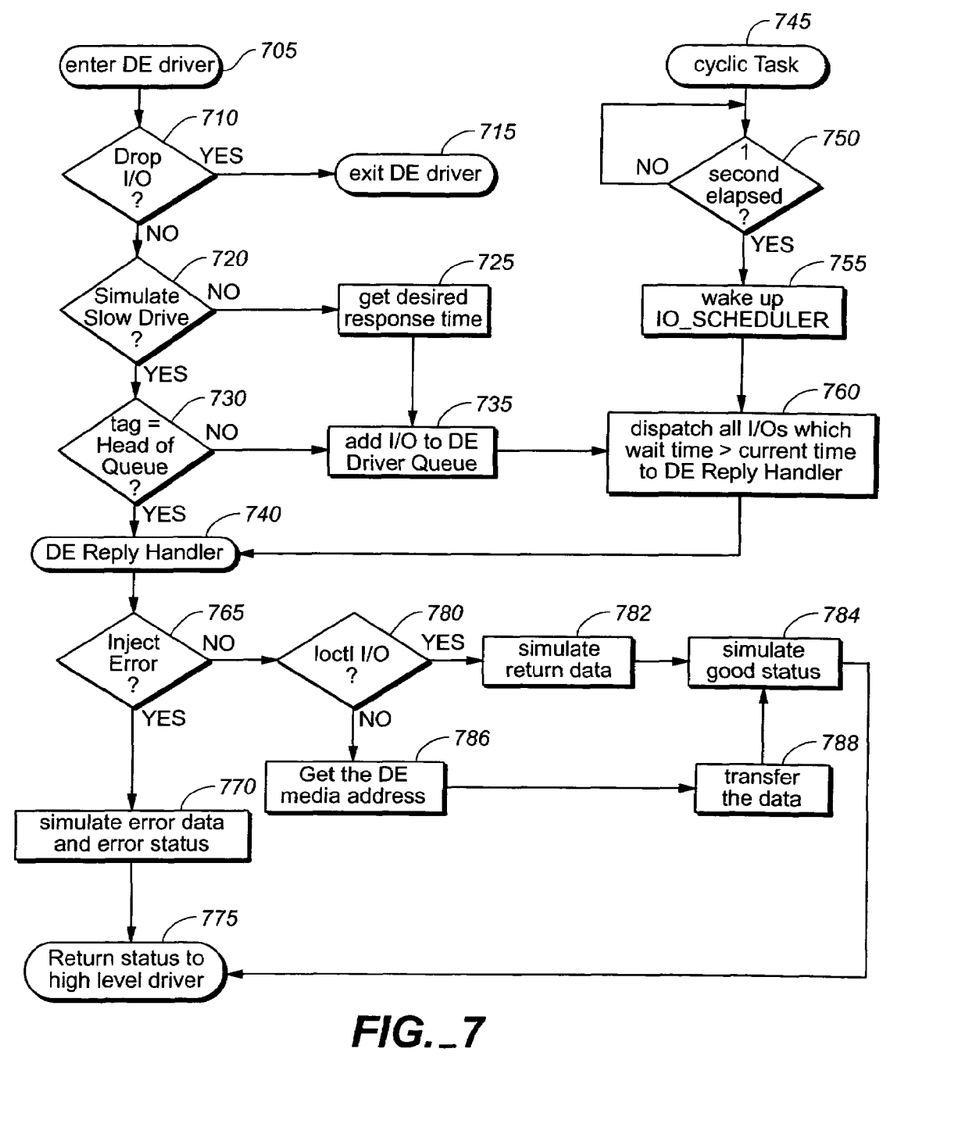
FIG. 7 illustrates an embodiment of the state transition in the method of the present invention.

The basic state transition of the CEM is illustrated in FIG. 7. The drive emulator driver is entered (705). If it is determined to drop I/O (710), the drive emulator driver is exited (715); otherwise, a determination is made as to whether to simulate a slow drive (720). If not, the desired response time is obtained (725) and I/O is added to the drive emulator driver queue (735). In a variation, the CEM is able to set a variety of speeds for the emulated drive, including variable speeds that may conform to a drive becoming defective. If a slow drive is to be simulated (720), a determination is made as to whether the driver is at the head of the queue (730). If not, I/O is added to the drive emulator driver queue (735). After I/O is added to the drive emulator driver queue (735), all I/Os having a wait time greater than the current time to drive emulator reply handler are dispatched (760). When a cyclic I/O task (745) is initiated, the I/O scheduler is invoked (755) after a time delay (750) (e.g., one second). All I/Os with wait times greater than the current time to the drive emulator reply handler are then dispatched (760). Once all I/Os are dispatched (760) or when the drive emulator driver is at the head of the drive emulator driver queue (740), a determination is made as to whether to inject an error (765). If the error is injected, error, data, and error status are simulated (770) and status is returned to the high level driver (775). If an error is not injected, a determination is made as to whether the I/O is local (780). For local I/O, return data (782) and good status (784) are simulated. For non-local I/O, the drive emulator media address is obtained (786), data is transferred (788), and good status is simulated (784). Then status is returned to the high level driver (775).

Figure 8:
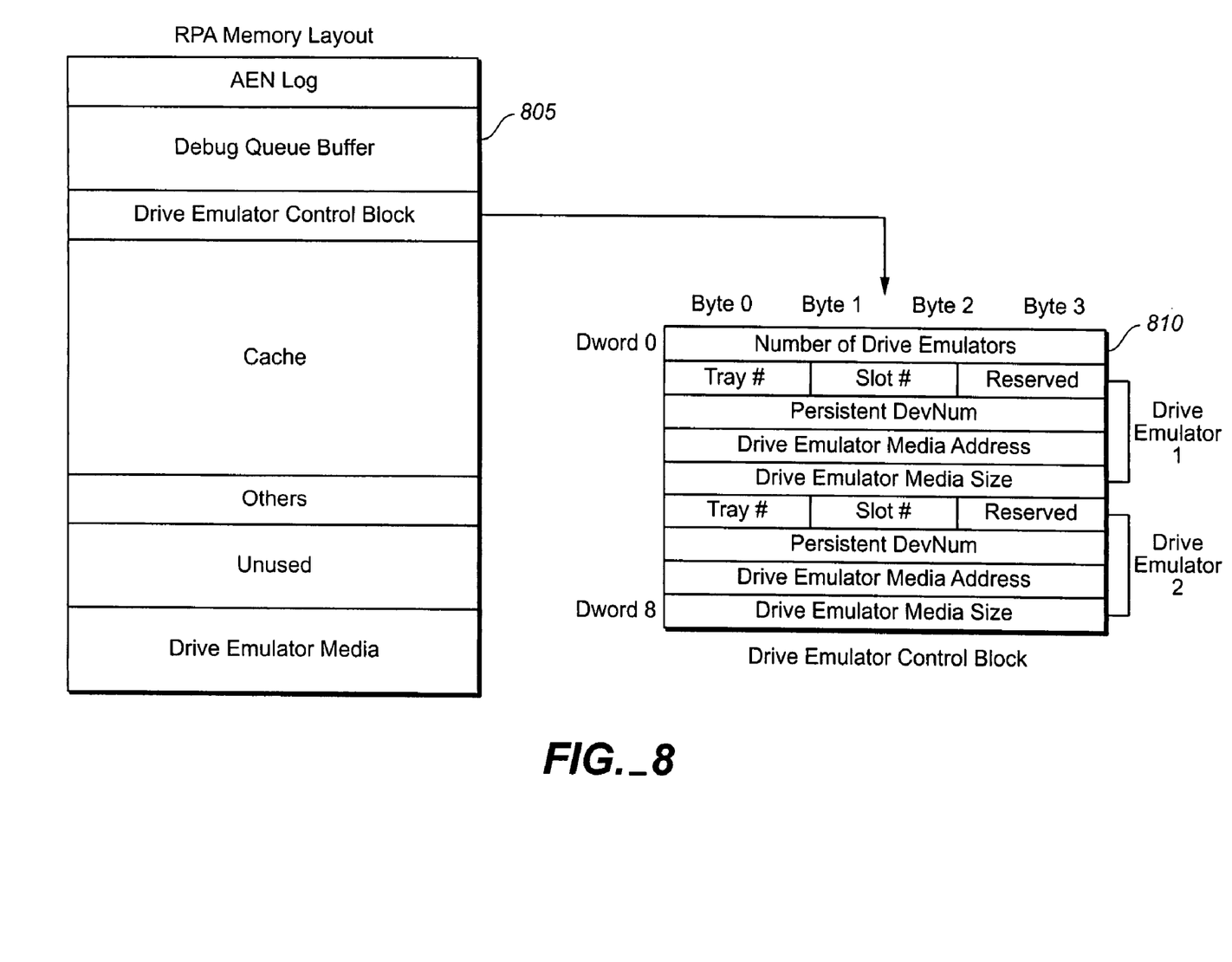
FIG. 8 illustrates an embodiment of RPA memory layout and the drive emulator control block in the present invention.

FIG. 8 illustrates an example of RPA memory layout 805. The RPA memory includes areas for agent event logging, a debug queue buffer, a drive emulator control block, cache, drive emulator media, etc. The drive emulator control block 810 is shown as contained nine data words in which each data word contains four bytes. The first data word is a header and contains information such as the number of drive emulators. The next four data words correspond to descriptive information about a first drive emulator. The descriptive information may include tray number, slot number, persistent device number, drive emulator media address, drive emulator media size, and the like. The next four data words similarly describe the next drive emulator.

Figure 9:
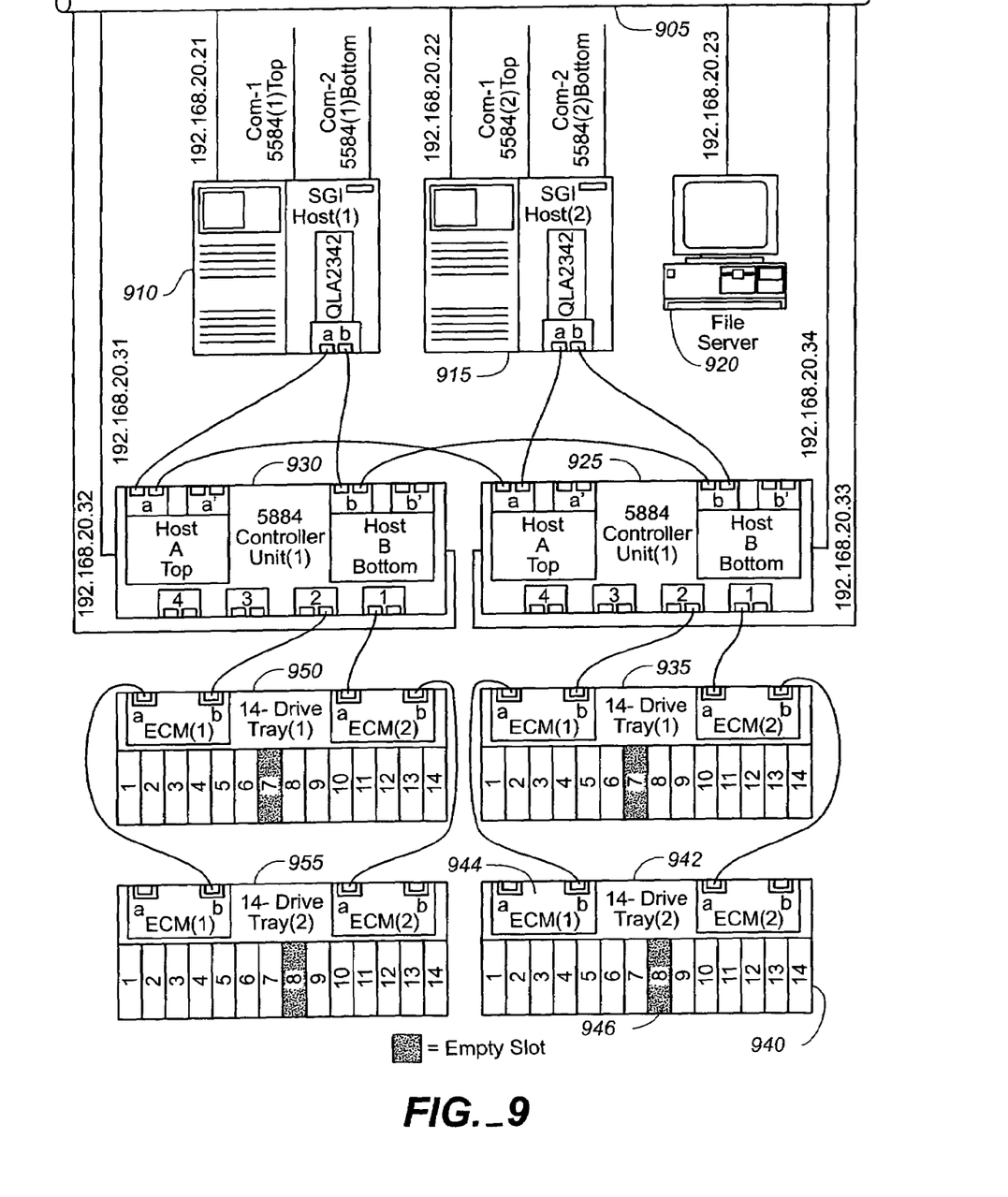
FIG. 9 illustrates an embodiment of a loop topology system configuration of the present invention.
Figure 10:
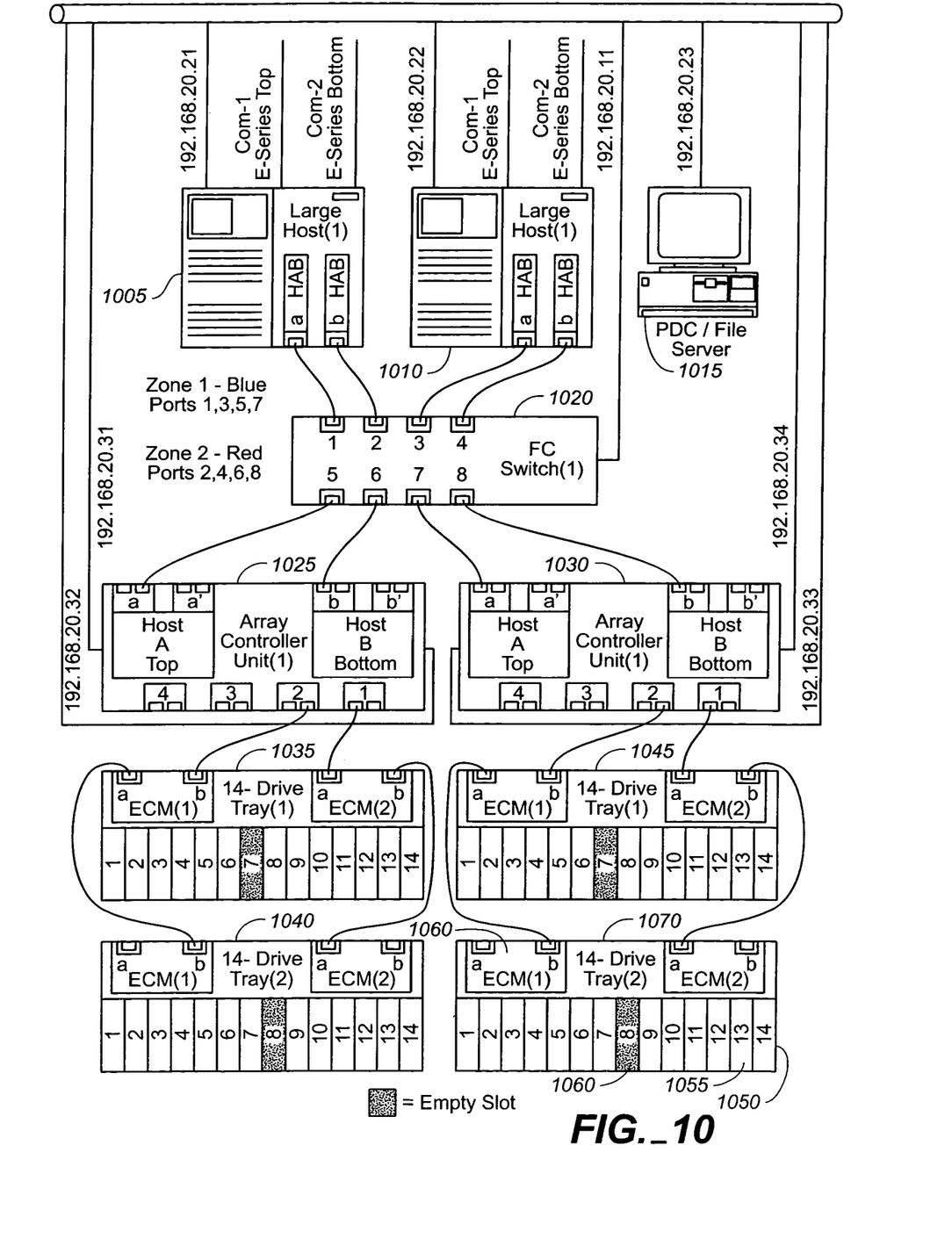
FIG. 10 illustrates an embodiment of a switch topology system configuration of the present invention.

FIGS. 9 and 10 illustrate different system configurations of the present invention. In FIG. 9, the basic system configuration is in a loop topology. Two hosts 910 and 915 are coupled to two controller units 930 and 925. Each controller unit interfaces with drive trays 950, 955, 935, 940 that are communicatively coupled in tandem. Each drive tray 942 contains emulator and control modules 944 and slots 946.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages, the form hereinbefore described being merely an explanatory embodiment thereof. It is the intention of the following claims to encompass and include such changes.

What is claimed is:

1. A method for controlling and emulating an array of storage devices, comprising:
   loading a controller and emulator module (CEM), the CEM controlling an interface between a low level driver and a storage device interface circuit, the storage device interface circuit directly interfacing an array of storage devices;
   feeding a command path to the CEM to interpret command strings;
   feeding a data path to the CEM to manage data of a data bus;
   emulating at least part of a status path by the CEM;
   emulating via the CEM at least one selected from a functional and a logical behavior of a storage device in the array of storage devices wherein a functional behavior of a storage device pertains to a functional operation of a storage device and a logical behavior of a storage device pertains to a logical operation of a storage device;
   simulating an error wherein the CEM generates simulated errors and returns simulated status messages to a high level driver; and
   recording results of said simulating in a computer readable medium.

2. The method of claim 1, further comprising emulating stimuli via the CEM corresponding to insertion of a physical drive into a drive tray.

3. The method of claim 2, further comprising notifying a high level driver of the insertion of the physical drive.

4. The method of claim 3, further comprising saving CEM information, wherein the simulated error comprises one selected from a simulated reset error, a simulated parity error, a simulated data underrun error, a simulated data overrun error, an simulated out of order frames error, and a simulated cyclic redundancy check (CRC) error.

5. The method of claim 3, further comprising notifying a configuration manager of the insertion of the physical drive.

6. The method of claim 1, further comprising emulating via the CEM corresponding to the removal of a physical drive from a drive tray.

7. The method of claim 6, further comprising notifying a subsystem manager of the removal of the physical drive.

8. The method of claim 7, further comprising notifying a configuration manager of the removal of the physical drive.

9. The method of claim 1, further comprising emulating via the CEM stimuli corresponding to a reset of an array controller.

10. A computer readable medium containing program instructions that perform method steps for controlling and emulating an array of storage devices, comprising:
- loading a controller and emulator module (CEM), the CEM controlling an interface between a low level driver and a storage device interface circuit, the storage device interface circuit directly interfacing an array of storage devices;
- feeding a command path to the CEM to interpret command strings;
- feeding a data path to the CEM to manage data of a data bus;
- emulating at least part of a status path by the CEM;
- emulating via the CEM at least one selected from a functional and a logical behavior of a storage device in the array of storage devices wherein a functional behavior of a storage device pertains to a functional operation of a storage device and a logical behavior of a storage device pertains to a logical operation of a storage device;
- simulating an error wherein the CEM generates simulated errors and returns simulated status messages to a high level driver; and
- recording results of said simulating in a computer readable medium.

11. The computer readable medium of claim 10, further comprising emulating stimuli via the CEM corresponding to insertion of a physical drive into a drive tray.

12. The computer readable medium of claim 11, further comprising notifying a high level driver of the insertion of the physical drive.

13. The computer readable medium of claim 12, further comprising saving CEM information, wherein the simulated error comprises one selected from a simulated reset error, a simulated parity error, a simulated data underrun error, a simulated data overrun error, an simulated out of order frames error, and a simulated cyclic redundancy check (CRC) error.

14. The computer readable medium of claim 10, further comprising at least one of the group consisting of emulating insertion of a physical drive, emulating removal of a physical drive, and emulating recovery of a physical drive from a reset of an array controller.

15. A system for controlling and emulating functional and logical behaviors of an array of storage devices having different protocols, comprising:
- an array controller;
- an array of storage devices communicatively coupled to the array controller, the array controller having a controller and emulator module (CEM), the CEM emulating capable of emulating one or more storage devices of the array of storage devices and emulating at least one selected from a functional and a logical behavior of the storage device in the array of storage devices wherein a functional behavior of a storage device pertains to a functional operation of a storage device and a logical behavior of a storage device pertains to a logical operation of a storage device, wherein the CEM generates at least one simulated error and returns at least one simulated status message to a high level driver; and
- a computer readable medium for recording a result of the emulation of the CEM.

16. The system of claim 15, wherein the CEM injects errors into data written to or read from at least one of the array of storage devices and the at least one simulated error comprises one selected from a simulated reset error, a simulated parity error, a simulated data underrun error, a simulated data overrun error, an simulated out of order frames error, and a simulated cyclic redundancy check (CRC) error.

17. The system of claim 16, wherein the array of storage devices is an array of disk drives and/or tape drives.

18. The system of claim 16, wherein the CEM collects statistical data on array controller performance.

19. The system of claim 16, wherein the array of storage devices include storage devices of different speeds.

20. The system of claim 16, wherein the array of storage devices include storage devices of different protocols.

21. The system of claim 15, wherein the CEM emulates insertion of a physical drive.

22. The system of claim 15, wherein the CEM emulates removal of a physical drive.

23. The system of claim 15, wherein the CEM emulates recovery of a physical drive after an array controller reset.

24. The system of claim 15, the array controller further comprising a low level driver and a storage device interface circuit, wherein the CEM interfaces the low level driver and the storage device interface circuit.

25. The system of claim 24, wherein the storage device interface circuit is a Fibre Channel chip.

26. A method for emulating and controlling an array of storage devices, comprising:
- determining absent and present storage devices;
- storing information about the absent and present storage devices;
- selecting at least one of the absent and present storage devices to be emulated;
- running an emulation, which emulates at least one selected from a functional and a logical behavior of the at least one absent and present storage devices wherein a functional behavior of a storage device pertains to a functional operation of a storage device and a logical behavior of a storage device pertains to a logical operation of a storage device;
- simulating an error, comprising generating simulated errors and returning simulated status messages to a high level driver, wherein the simulated error comprises one selected from a simulated reset error, a simulated parity error, a simulated data underrun error, a simulated data overrun error, an simulated out of order frames error, and a simulated cyclic redundancy check (CRC) error; and
- and displaying results of said simulating.

27. The method of claim 26, wherein selecting the at least one of the absent and present storage devices to be emulated involves selecting an absent storage device.

28. The method of claim 26, wherein the present storage devices are disk drives inserted into slots of a tray and the absent storage devices are empty slots in the tray.

29. The method of claim 27, wherein the selected at least one of the absent and present storage devices is emulated for storage device insertion.

30. The method of claim 27, wherein the selected at least one of the absent and present storage devices is emulated for storage device removal.

31. The method of claim 27, wherein the selected at least one of the absent and present storage devices is emulated for a storage device recovery function.

* * * * *